United States Patent
Bian et al.

(10) Patent No.: US 11,550,200 B2
(45) Date of Patent: Jan. 10, 2023

(54) RECONFIGURABLE OPTICAL GRATING/COUPLER

(71) Applicant: GLOBALFOUNDRIES U.S. Inc., Santa Clara, CA (US)

(72) Inventors: Yusheng Bian, Ballston, NY (US); Ajey Poovannummoottil Jacob, Watervliet, NY (US)

(73) Assignee: GlobalFoundries U.S. Inc., Malta, NY (US)

(*) Notice: Subject to any disclaimer, the term of this patent is extended or adjusted under 35 U.S.C. 154(b) by 52 days.

(21) Appl. No.: 16/808,613

(22) Filed: Mar. 4, 2020

(65) Prior Publication Data

US 2021/0278742 A1   Sep. 9, 2021

(51) Int. Cl.
G02F 1/313   (2006.01)

(52) U.S. Cl.
CPC ........ *G02F 1/313* (2013.01); *G02F 2201/302* (2013.01)

(58) Field of Classification Search
CPC ........................... G02F 1/313; G02F 2201/302
See application file for complete search history.

(56) References Cited

U.S. PATENT DOCUMENTS

| | | | |
|---|---|---|---|
| 4,006,963 A | | 2/1977 | Baues et al. |
| 6,356,674 B1 | | 3/2002 | Davis et al. |
| 6,821,457 B1 | | 11/2004 | Natarajan et al. |
| 10,852,484 B2 | * | 12/2020 | Testa ..................... G02B 6/4202 |
| 2012/0014398 A1 | * | 1/2012 | Choi ..................... H01S 5/02251 372/20 |
| 2016/0064526 A1 | * | 3/2016 | Jacob ............... H01L 21/30604 438/492 |
| 2017/0192170 A1 | * | 7/2017 | Baudot .................... G02B 6/34 |
| 2019/0369333 A1 | * | 12/2019 | Testa ...................... G02B 6/305 |
| 2020/0241205 A1 | * | 7/2020 | Kojima .............. G02B 6/12019 |

OTHER PUBLICATIONS

Giewont et al., "300-mm Monolithic Silicon Photonics Foundry Technology," IEEE Journal of Selected Topics in Quantum Electronics, 25:8200611, Apr. 2019.
Hong and Yokoyama, "Efficient Silicon Nitride Grating Coupler with a Dielectric Multilayer Reflector," 2017 The Japan Society of Applied Physics, pp. 58-59, 22nd Microoptics Conference (MOC2017), Tokyo, Japan, Nov. 19-22, 2017.
Kim et al., "Tunable Grating Couplers for Broadband Operation Using Thermo-Optic Effect in Silicon," IEEE Photonics Technology Letters, 27:2304-07, Nov. 1, 2015.
Zhang et al., "Efficient silicon nitride grating coupler with distributed Bragg reflectors," Optics Express, 22:21800-05, Sep. 2, 2014.

* cited by examiner

*Primary Examiner* — Sung H Pak
*Assistant Examiner* — Hoang Q Tran
(74) *Attorney, Agent, or Firm* — Yee Tze Lim; Hoffman Warnick LLC

(57) ABSTRACT

One illustrative device disclosed herein includes a lower waveguide structure and an upper body structure positioned above at least a portion of the lower waveguide structure. In this example, the device also includes a grating structure positioned in the upper body structure, wherein the grating structure comprises a plurality of grating elements that comprise a tunable material whose index of refraction may be changed by application of energy to the tunable material.

20 Claims, 14 Drawing Sheets

RECONFIGURABLE OPTICAL GRATING/COUPLER

BACKGROUND

Field of the Invention

The present disclosure generally relates to various novel embodiments of a reconfigurable optical grating/coupler, various novel methods of making such a device and photonic integrated circuit (PIC) products comprising such a reconfigurable optical grating/coupler.

Description of the Related Art

A need for greater bandwidth in fiber optic network links is widely recognized. The volume of data transmissions has seen a dramatic increase in the last decade. This trend is expected to grow exponentially in the near future. As a result, there exists a need for deploying an infrastructure capable of handling this increased volume and for improvements in system performance. Photonics chips are used in many applications. A photonics chip integrates optical components, such as waveguides, couplers, optical grating structures, etc., and electronic components, such as integrated circuits comprised of CMOS-based field-effect transistors, into a unified platform. The optical components are formed in a photonics region of the product while the CMOS-based integrated circuits are formed in a CMOS region of the product.

Fiber optics communications have gained prominence in telecommunications, instrumentation, cable TV, network, and data transmission and distribution. As noted above, there are many types of optical components in a typical photonics chip, e.g., optical grating structures, waveguides, light couplers, splitters, filters, etc. There is a constant drive to reduce the physical size of all aspects of the devices and structures formed on a photonics chip.

The present disclosure is generally directed to various novel embodiments of a reconfigurable optical grating/coupler, various novel methods of making such a device and photonic integrated circuit (PIC) products comprising such a reconfigurable optical grating/coupler.

SUMMARY

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present disclosure is directed to various novel embodiments of a reconfigurable optical grating/coupler, various novel methods of making such a device and photonic integrated circuit (PIC) products comprising such a reconfigurable optical grating/coupler. One illustrative device disclosed herein includes a lower waveguide structure and an upper body structure positioned above at least a portion of the lower waveguide structure. In this example, the device also includes a grating structure positioned in the upper body structure, wherein the grating structure comprises a plurality of grating elements that comprise a tunable material whose index of refraction may be changed by application of energy to the tunable material.

BRIEF DESCRIPTION OF THE DRAWINGS

The disclosure may be understood by reference to the following description taken in conjunction with the accompanying drawings, in which like reference numerals identify like elements, and in which.

Figure 1:
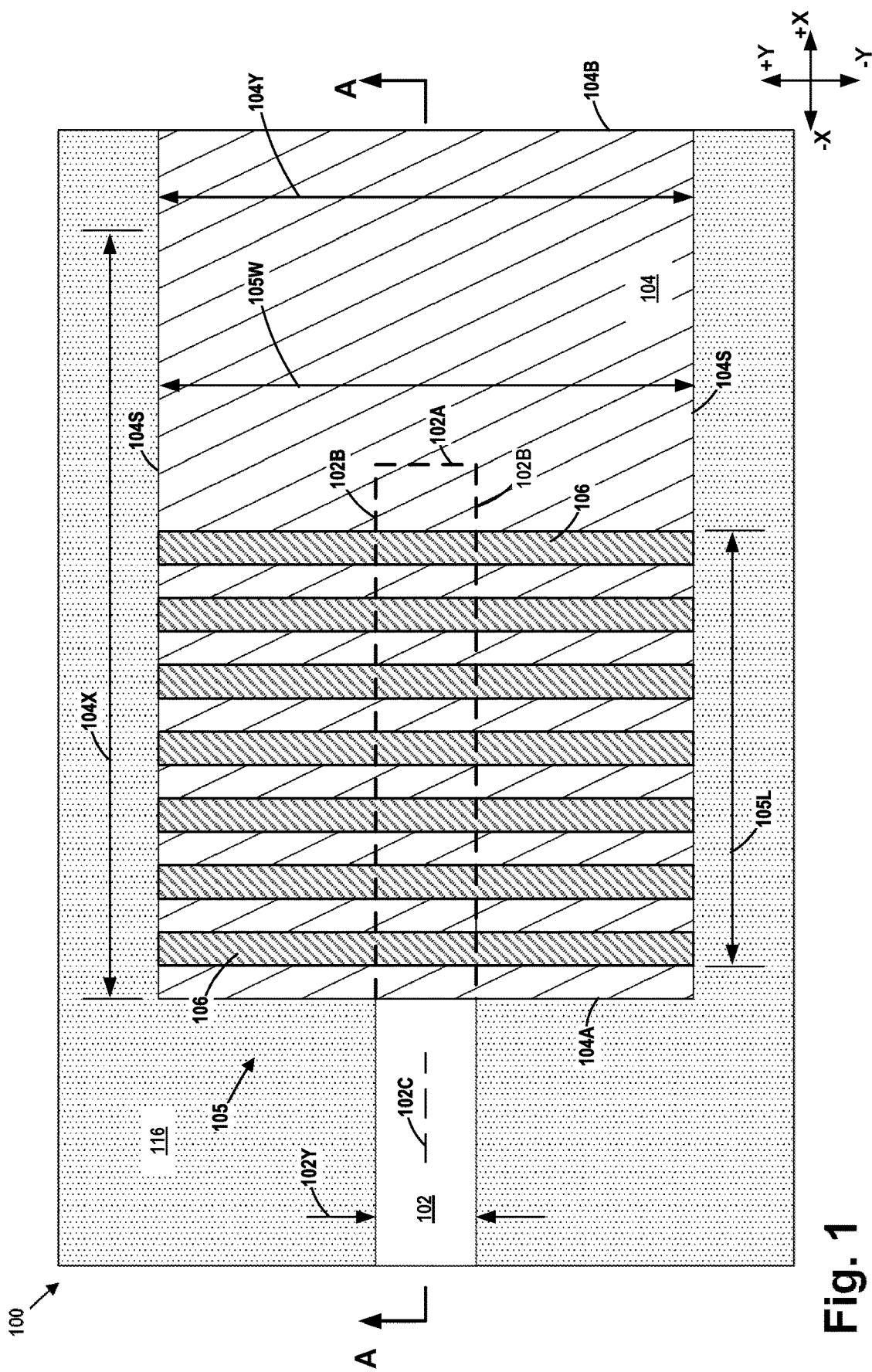
FIGS. 1-14 depict various novel embodiments of a photonic component that includes a reconfigurable optical grating/coupler, various novel methods of making such a device and photonic integrated circuit (PIC) products comprising such a reconfigurable optical grating/coupler. The drawings are not to scale.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the under-standing of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. As will be readily apparent to those skilled in the art upon a complete reading of the present application, the presently disclosed method may be applicable to a variety of products, including, but not limited to, logic products, memory products, etc. With reference to the attached figures, various illustrative embodiments of the methods and devices disclosed herein will now be described in more detail. The various components, structures and layers of material depicted herein may be formed using a variety of different materials and by performing a variety of known process operations, e.g., chemical vapor deposition (CVD), atomic layer deposition (ALD), a thermal growth process, spin-coating techniques, masking, etching, etc. The thicknesses of these various layers of material may also vary depending upon the particular application.

FIGS. 1-14 depict various novel embodiments of a reconfigurable optical grating/coupler 100, various novel methods of making such a device and photonic integrated circuit (PIC) products comprising such a reconfigurable optical grating/coupler 100. FIG. 1 is a plan view of one illustrative embodiment of a reconfigurable optical grating/coupler 100 disclosed herein. The location where a cross-sectional view (A-A) of various embodiments of the reconfigurable optical grating/coupler 100 is taken is also depicted in the plan view. More specifically, the cross-sectional view A-A is taken through the reconfigurable optical grating/coupler 100 in the X direction. Various layers of insulating material that are depicted in the cross-sectional views are not depicted in the plan views so as to facilitate explanation of the subject matter disclosed herein. The drawings also include reference directions (X, Y and Z) in the lower right-hand corner of the drawings.

As will be appreciated by those skilled in the art after a complete reading of the present application, the reconfigurable optical grating/coupler 100 disclosed herein is reconfigurable in the sense that it may be configured to be in one of two functional states—it is bifunctional. In the first state, the reconfigurable optical grating/coupler 100 may be configured to operate as a vertical optical grating coupler that is adapted to couple light to or from a laser (e.g., a surface mounted laser) or an optical fiber to a photonic waveguide. In the second state, the reconfigurable optical grating/coupler 100 may be configured to operate as a coupler that is adapted to allow transmission of light between two different photonic waveguides that are positioned at different levels on the chip.

In the depicted examples, the reconfigurable optical grating/coupler 100 will be formed above a semiconductor substrate 101. The substrate 101 may have a variety of configurations, such as a semiconductor-on-insulator (SOI) shown herein. Such an SOI substrate 101 includes a base semiconductor layer 101A, a buried insulation layer 101B positioned on the base semiconductor layer 101A and an active semiconductor layer 101C positioned above the buried insulation layer 101B. The thickness of the active semiconductor layer 101C and the buried insulation layer 101B may vary depending upon the particular application. In one illustrative embodiment, the active semiconductor layer 101C may be substantially free of any appreciable amount of dopant material, i.e., the active semiconductor layer 101C may be an intrinsic semiconductor material. The active semiconductor layer 101C and the base semiconductor layer 101A need not be made of the same semiconductor material, but that may be the case in some applications. In some applications, the active semiconductor layer 101C and the base semiconductor layer 101A may be made of silicon or they may be made of semiconductor materials other than silicon. Thus, the terms "substrate" or "semiconductor substrate" should be understood to cover all semiconductor materials and all forms of such materials. The buried insulation layer 101B may comprise any desired insulating material, e.g., silicon dioxide, silicon nitride, etc.

Figure 2:
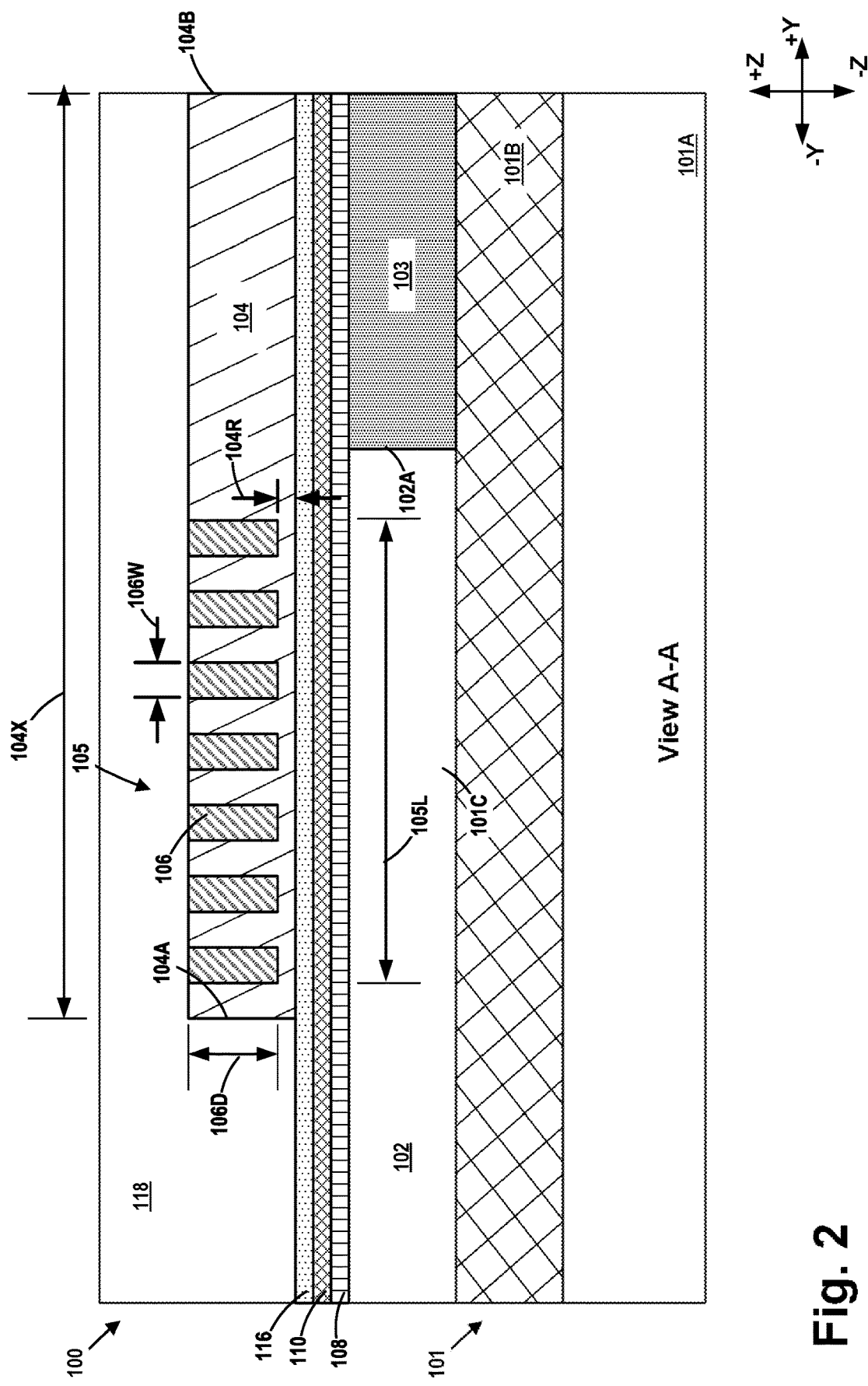

FIG. 1 (plan view) and FIG. 2 (cross-sectional view) depict one illustrative embodiment of the reconfigurable optical grating/coupler 100 disclosed herein. As depicted, the illustrative reconfigurable optical grating/coupler 100 comprises a lower waveguide structure 102 (which, in one illustrative embodiment, is formed from the active semiconductor layer 101C) and an upper body structure 104 positioned above a portion of the lower waveguide structure 102. Also depicted in FIGS. 1 and 2 is a grating structure 105 that is formed in the upper body structure 104. The grating structure 105 comprises a plurality of grating elements 106.

Of course, the reconfigurable optical grating/coupler 100 may be formed at any desired level above the substrate 101, i.e., the lower waveguide structure 102 need not be etched from the active semiconductor layer 101C (as described above) but that may be the case in some applications.

Also depicted in FIGS. 1 and 2 is an insulating material 116, e.g., silicon dioxide, that is formed above the active semiconductor layer 101C. FIG. 2 depicts additional layers of insulating material that are not depicted FIG. 1. More specifically, FIG. 2 depicts a layer of insulating material 108, e.g., silicon dioxide, that was formed on the active semiconductor layer 101C, and another layer of insulating material 110, e.g., silicon nitride, that was formed on the layer of insulating material 108. The layer of insulating material 110 is optional and need not be present in all possible embodiments of the reconfigurable optical grating/coupler 100 disclosed herein. If the layer of insulating material 110 is present, the layer of insulating material 116 may be formed on top of the layer of insulating material 110. Also depicted in FIG. 2 is a representative one or more layers of insulating material 118. In a real-world device, the one or more layers of insulating material 118 may comprise multiple layers of material and the layers of material may be made of different materials. For example, the one or more layers of insulating material 118 may comprise one of more layers of silicon dioxide with a layer of silicon nitride (which functions as an etch stop layer) positioned between the layers of silicon dioxide. The structure, composition and techniques used to form such layer(s) of insulating material 108, 110, 116 and 118 are well known to those skilled in the art. With reference to FIG. 2, and as mentioned above, in one illustrative embodiment, the lower waveguide structure 102 was formed by patterning the active semiconductor layer 101C of the substrate 101 by performing known masking and etching techniques. Thereafter, an insulating material 103 was deposited on the substrate 101 and a CMP process was performed to remove excess amounts of the insulating material 103 from above the upper surface of the active semiconductor layer 101C.

With continuing reference to FIGS. 1 and 2, the lower waveguide structure 102 has a front surface 102A, side surfaces 102B, a lateral width 102Y (that extends in the Y direction) and a longitudinal centerline 102C (that extends in the X direction). The upper body structure 104 has a front surface 104A, a rear surface 104B, side surfaces 104S, a lateral width 104Y (in the Y direction) and an axial length 104X (in the X direction). The physical dimensions (i.e., length, width and thickness) of the lower waveguide structure 102 and the upper body structure 104 may vary depending upon the particular application.

When viewed from above, the configuration of the lower waveguide structure 102 and the configuration of the upper body structure 104 may vary depending upon the particular application. In the example shown in FIG. 1, both the lower waveguide structure 102 and the upper body structure 104 have substantially rectangular-shaped configurations. Other configurations are, of course, possible for the upper body structure 104 and/or the lower waveguide structure 102, e.g., they may have a tapered configuration, a portion may take the form of a trapezoid, etc. The upper body structure 104 and the lower waveguide structure 102 need not have the same type of configuration (when viewed from above), but that may be the case in some applications.

The lower waveguide structure 102 of the reconfigurable optical grating/coupler 100 may be comprised of any desired material, e.g., silicon, silicon nitride, aluminum nitride, SiON, etc. The upper body structure 104 of the reconfigurable optical grating/coupler 100 may be comprised of any desired material, e.g., silicon-germanium, germanium, silicon, silicon nitride, aluminum nitride, SiON, etc. The upper body structure 104 and the lower waveguide structure 102 need not be made of the same material, but that may be the case in some applications.

With reference to FIG. 1, the grating structure 105 has an axial length 105L (in the X direction—substantially parallel to the centerline 102C of the lower waveguide structure 102) and a lateral width 105W (in the Y direction—transverse to the centerline 102C of the lower waveguide structure 102). The axial length 105L and the lateral width 105W of the grating structure 105 may vary depending upon the particular application. In the example shown in FIG. 1, the lateral width 105W of the grating structure 105 is substantially the same as the lateral width 104Y of the upper body structure 104 and greater than the lateral width 102Y of the lower waveguide structure 102, but that may not be the case in all applications. As depicted, when viewed from above, at least a portion of the grating structure 105 is positioned vertically above at least a portion of the lower waveguide structure 102. In one particular embodiment, when viewed from above, an entirety of the axial length 105L of the grating structure 105 is positioned vertically above the lower waveguide structure 102, while the lateral width 105W of the grating structure 105 is greater than the lateral width 102Y of the lower waveguide structure 102.

In the examples depicted herein, the grating structure 105 comprises seven illustrative and representative grating elements 106 that are formed in the upper body structure 104 of the reconfigurable optical grating/coupler 100. In the embodiment shown in FIG. 1, the grating elements 106 extend across the entire lateral width 104Y of the upper body structure 104, but that may not be the case in all applications. Of course, as will be appreciated by those skilled in the art after a complete reading of the present application, the grating structure 105 may comprise any desired number of the grating elements 106 and the grating elements 106 may be of any desired configuration when viewed from above and in the cross-sectional view A-A.

With reference to FIG. 2. the grating elements 106 have a depth 106D (in the Z direction) and a width 106W (in the X direction). The physical dimensions of the grating elements 106 and the spacing between adjacent grating elements 106 may vary depending upon the particular application. In one illustrative embodiment, the grating elements 106 of the grating structure 105 may have periodic and uniform spacing between the grating elements 106. However, the physical dimensions of all of the grating elements 106 in the grating structure 105 need not be uniform, but that may be the case in some applications. In the example depicted in FIG. 2, the depth 106D of the grating elements 106 is less than the vertical thickness of the upper body structure 104, leaving an amount 104R of the upper body structure 104 positioned under the grating elements 106. In one illustrative embodiment, the depths 106D may range from about 50-300 nm, the width 106W may range from about 200-500 nm, the spacing between adjacent grating elements 106 may range from about 200-500 nm and the remaining thickness 104R of the upper body structure 104 may be about 50-300 nm. If desired, the grating elements 106 may have a cross-sectional configuration that is different from the substantially rectangular cross-sectional configuration shown in the cross-sectional views (A-A) depicted herein, e.g., the grating elements 106 could have a substantially triangular shaped cross-sectional configuration when viewed in a similar cross-section. Moreover, the cross-sectional configuration of all of the grating elements 106 need not be the same, but that may be the case in some applications.

In the depicted example, grating elements 106 comprise a tunable material whose index of refraction may be changed by application of energy to the tunable material, e.g., electrical energy, light energy, thermal energy, etc., as will described more fully below. Examples of such tunable materials include, but are not limited to, ITO, $VO_2$, other electro-optic or phase change materials, etc.

In one illustrative process flow, trenches for the tunable material were formed in the upper body structure 104 by performing known masking and etching processes. Thereafter, the tunable material of the grating elements 106 may be deposited so as to overfill the trenches in the upper body structure 104. Next, a chemical mechanical polishing (CMP) process may be performed to remove excess amounts of the tunable material positioned outside of the trenches in the upper body structure 104.

Figure 3:
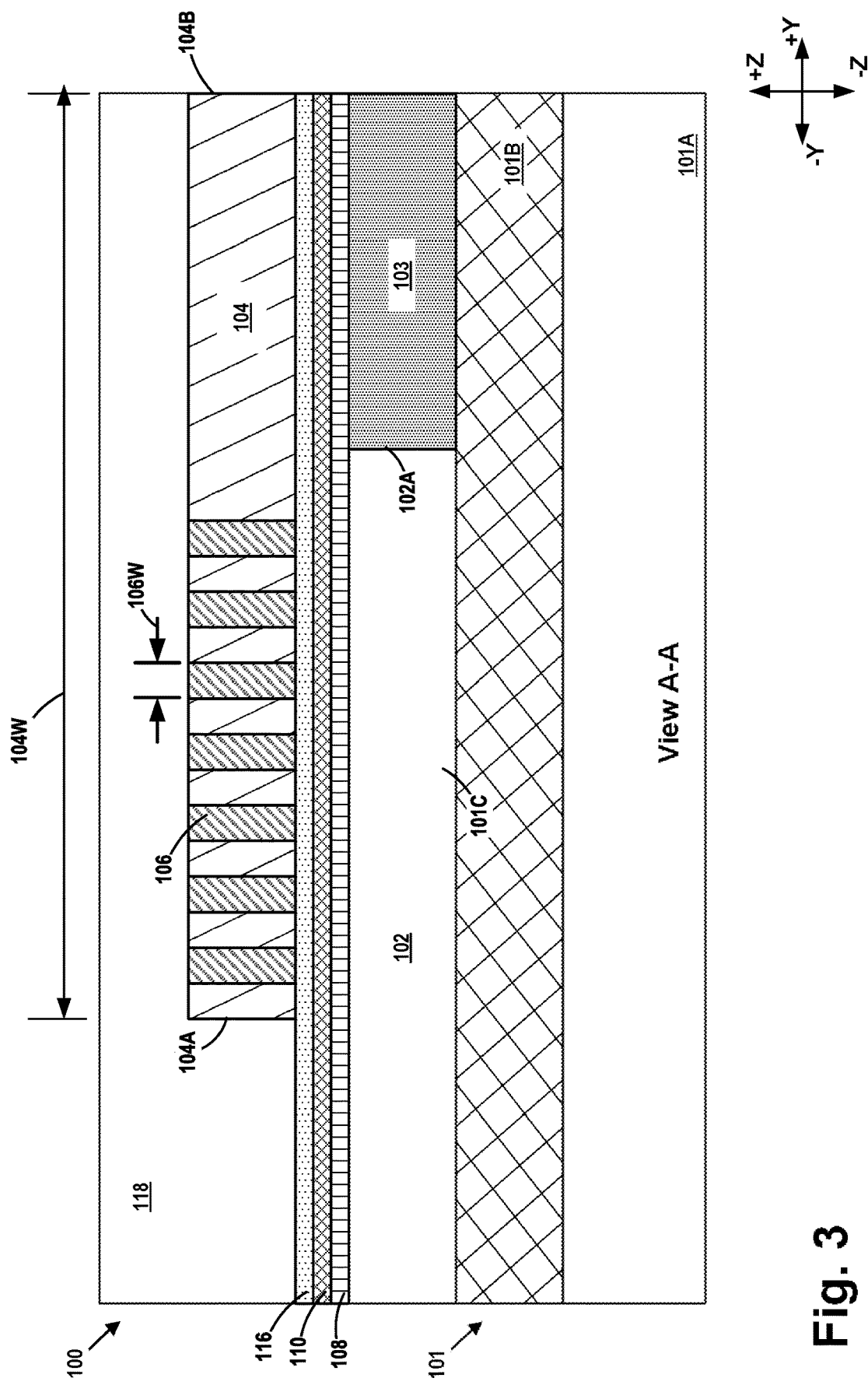

FIG. 3 depicts another illustrative embodiment of the reconfigurable optical grating/coupler 100 wherein the grating elements 106 of the grating structure 105 extend throughout the entire vertical thickness of the upper body structure 104 and contact the layer of insulating material 116.

Figure 4:
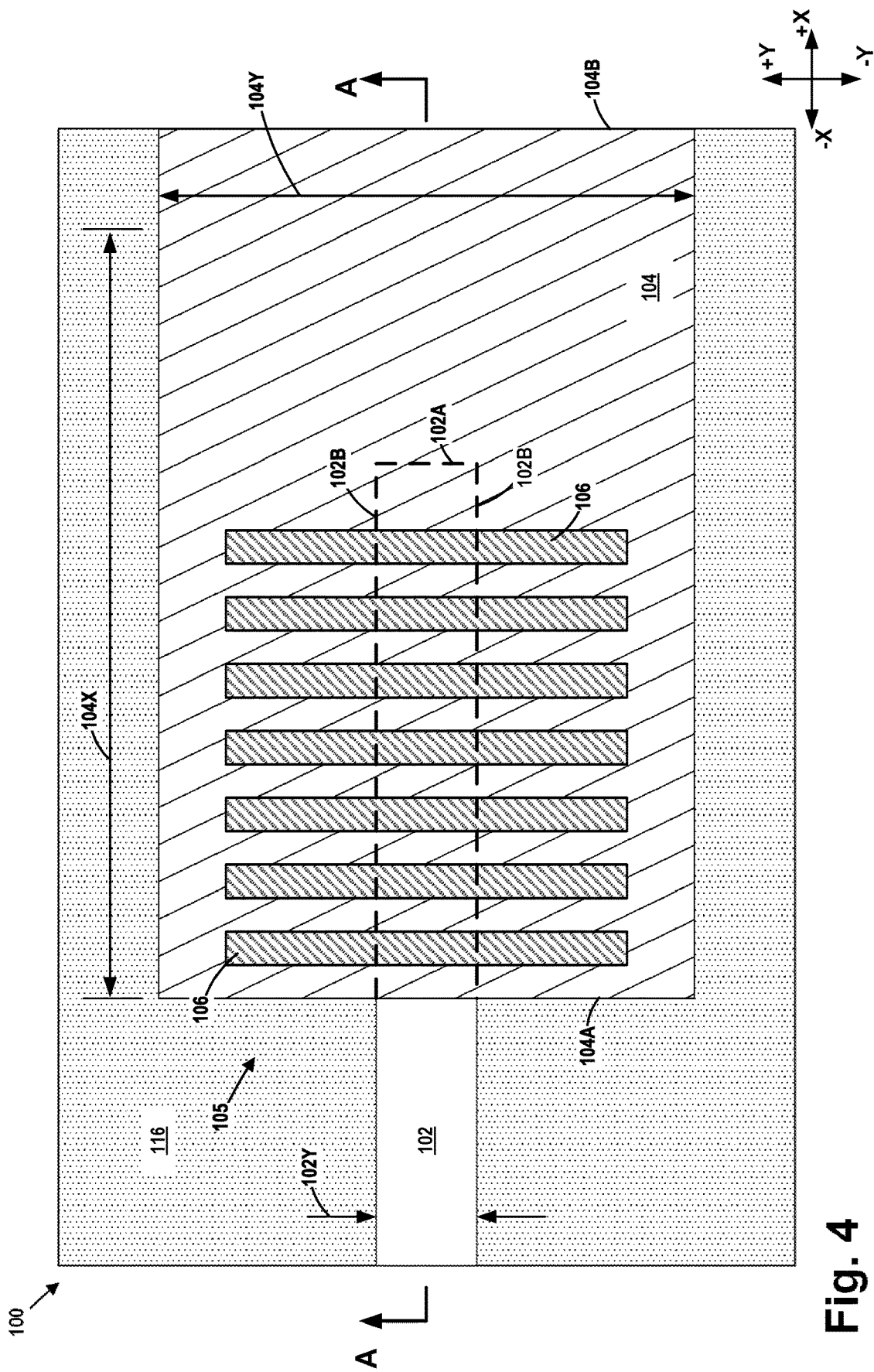

FIG. 4 is a plan view that depicts another illustrative embodiment of the reconfigurable optical grating/coupler 100 wherein the grating elements 106 of the grating structure 105 do not extend across the entire lateral width 104Y of the upper body structure 104.

Figure 5:
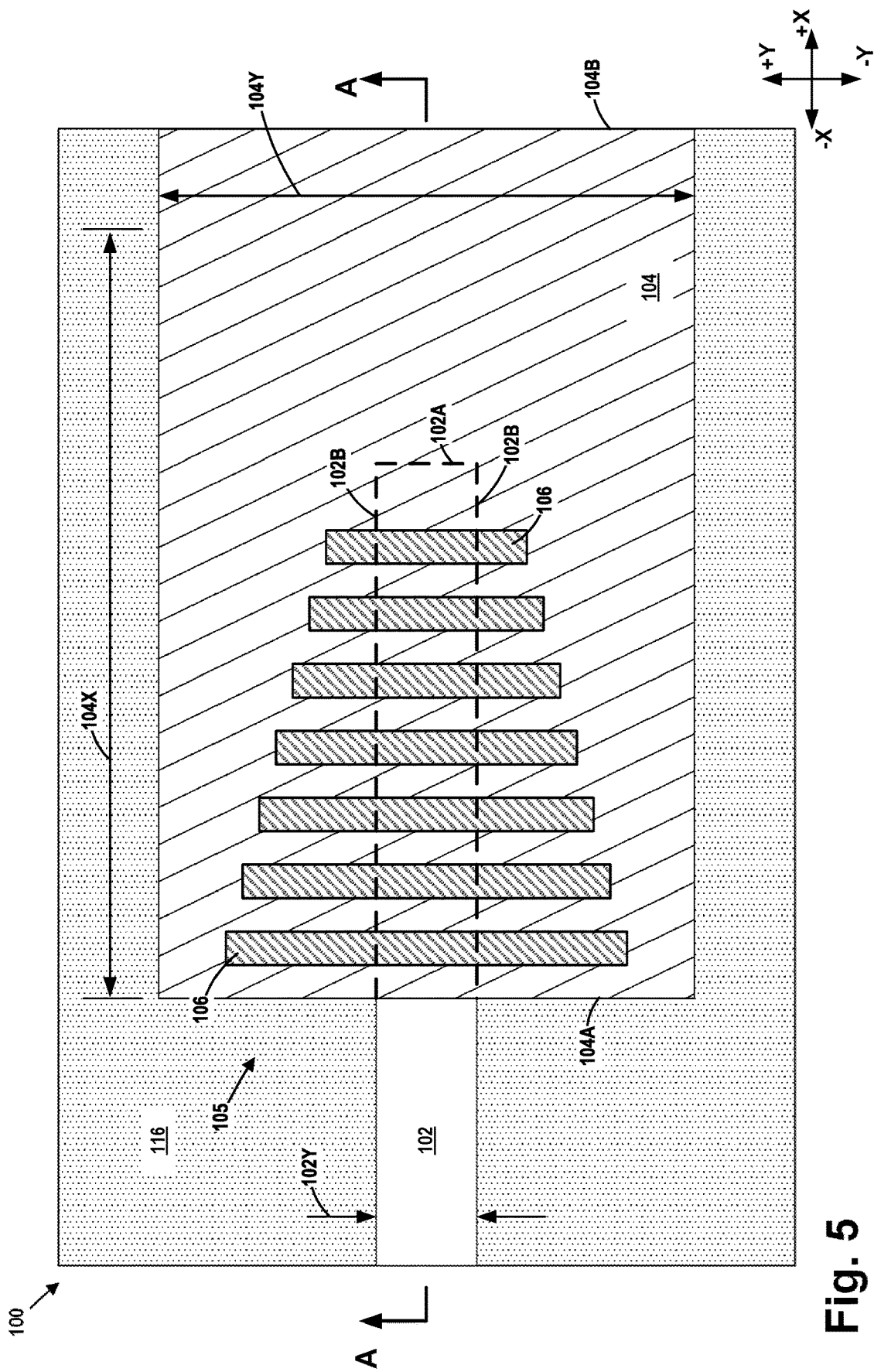

FIG. 5 is a plan view that depicts another illustrative embodiment of the reconfigurable optical grating/coupler 100 wherein the grating elements 106 of the grating structure 105 do not extend across the entire lateral width 104Y of the upper body structure 104 and wherein each of the grating elements 106 have different lengths in the Y direction.

Figure 6:
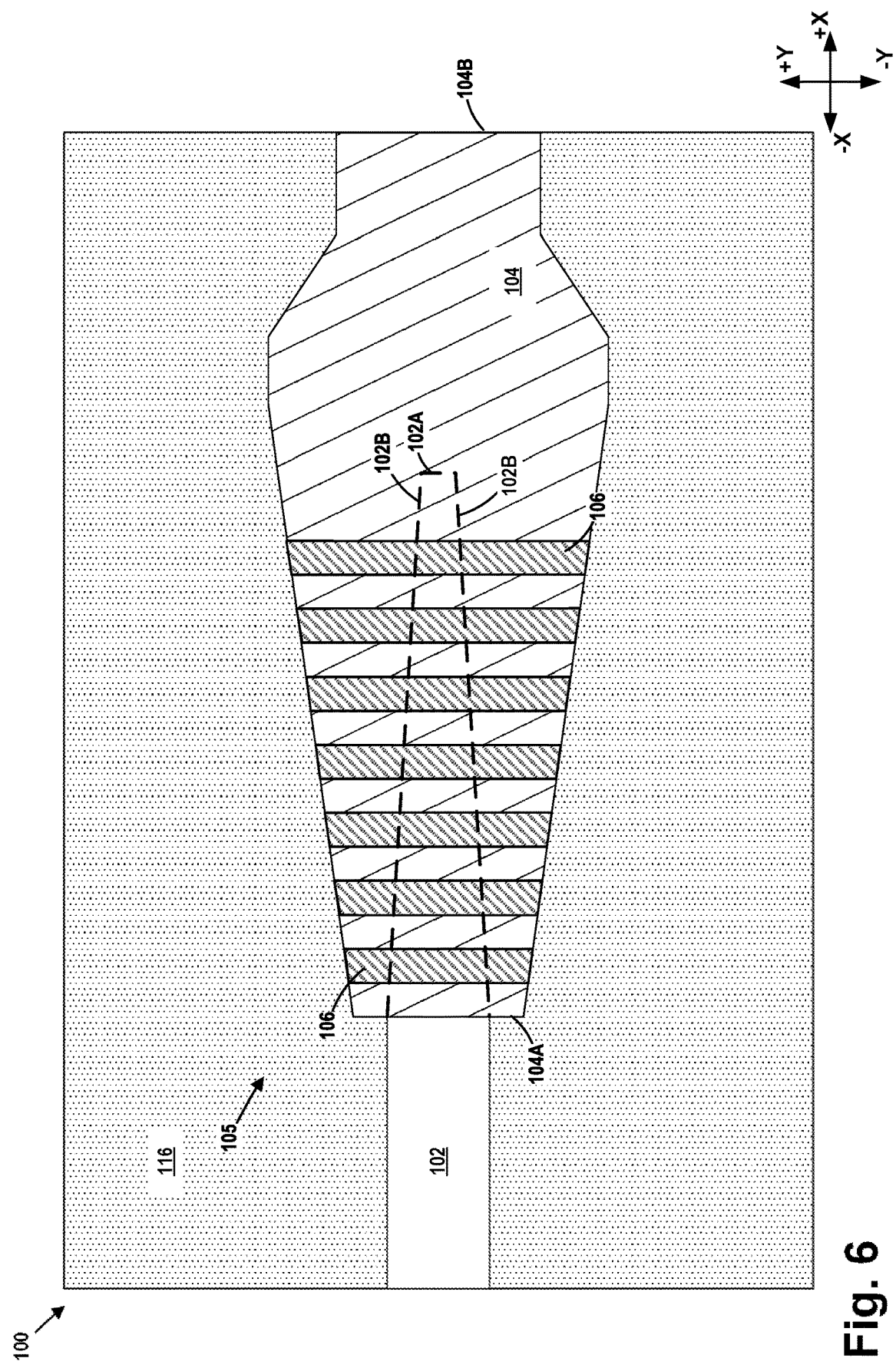

As mentioned above, when viewed from above, the configuration of the lower waveguide structure 102 and the configuration of the upper body structure 104 may vary depending upon the particular application. FIG. 6 depicts an example of the reconfigurable optical grating/coupler 100 wherein a portion of the upper body structure 104 has a tapered configuration that gets wider as one progresses from the front surface 104A toward the back surface 104B. Also note that, in this example, the portion of the lower waveguide structure 102 positioned under the upper body structure 104 also has a tapered configuration that decreases as one progresses from left to right toward the end surface 102A.

As noted above, the state of the tunable material of the grating elements 106 may be changed from a first state to a second state by application of some form of energy to the tunable material of the grating elements 106. When the energy supplied to the tunable material is stopped, the tunable material will return to its original state. In one illustrative embodiment, the energy may take the form of thermal energy that is input into the grating elements 106 of the grating structure 105, wherein the thermal energy is produced by resistance heating of various conductive layers or components positioned proximate the grating elements 106. In other embodiments, the energy applied to the grating elements 106 may take the form of light energy that is directed from a light source, e.g., a laser, a fiber optic cable, etc., toward the grating structure 105.

In one illustrative embodiment, the tunable material of the grating elements 106 may be selected such that, at all anticipated operating conditions of the chip, the grating elements 106 have an index of refraction that is different from the index of refraction of the material of the upper body structure 104 and the reconfigurable optical grating/coupler 100 functions as an optical grating structure, e.g., at all anticipated operating conditions of the reconfigurable optical grating/coupler 100, the index of refraction for the tunable material of the grating elements 106 may be less than or greater than (depending on the particular tunable material) the index of refraction of material of the upper body structure 104. In one illustrative embodiment, when the reconfigurable optical grating/coupler 100 functions as an optical grating structure, the magnitude of the difference in the index of refraction for the tunable material of the grating elements 106 as compared to the index of refraction of material of the upper body structure 104 may be about 1-3.

The reconfigurable optical grating/coupler 100 may be changed from its first functional state—where it functions as an optical grating structure—to its second functional state—where it functions as a coupler that is adapted to allow transmission of light between two different photonic waveguides that are positioned at different levels on the chip—by application of an appropriate amount of energy (from any source) to the tunable material of the grating elements 106. More specifically, upon application of the energy to the tunable material of the grating elements 106, the index of refraction of the tunable material of the grating elements 106 increases or decreases until such time as the index of refraction of the tunable material of the grating elements 106 may be approximately the same as the index of refraction of the material of the upper body structure 104. For example, in the second state, the index of refraction for the tunable material of the grating elements 106 may be within about 50-200% of the index of refraction of the material of the upper body structure 104. As noted above, in this second state, the reconfigurable optical grating/coupler 100 functions as a coupler that is adapted to allow transmission of light between two different photonic waveguides that are positioned at different levels on the chip, wherein the upper body structure 104 of the reconfigurable optical grating/coupler 100 functions as an upper waveguide positioned above the lower waveguide structure 102. In some embodiments, in the second state, the reconfigurable optical grating/coupler 100 may function as adiabatic coupler.

Figure 7:
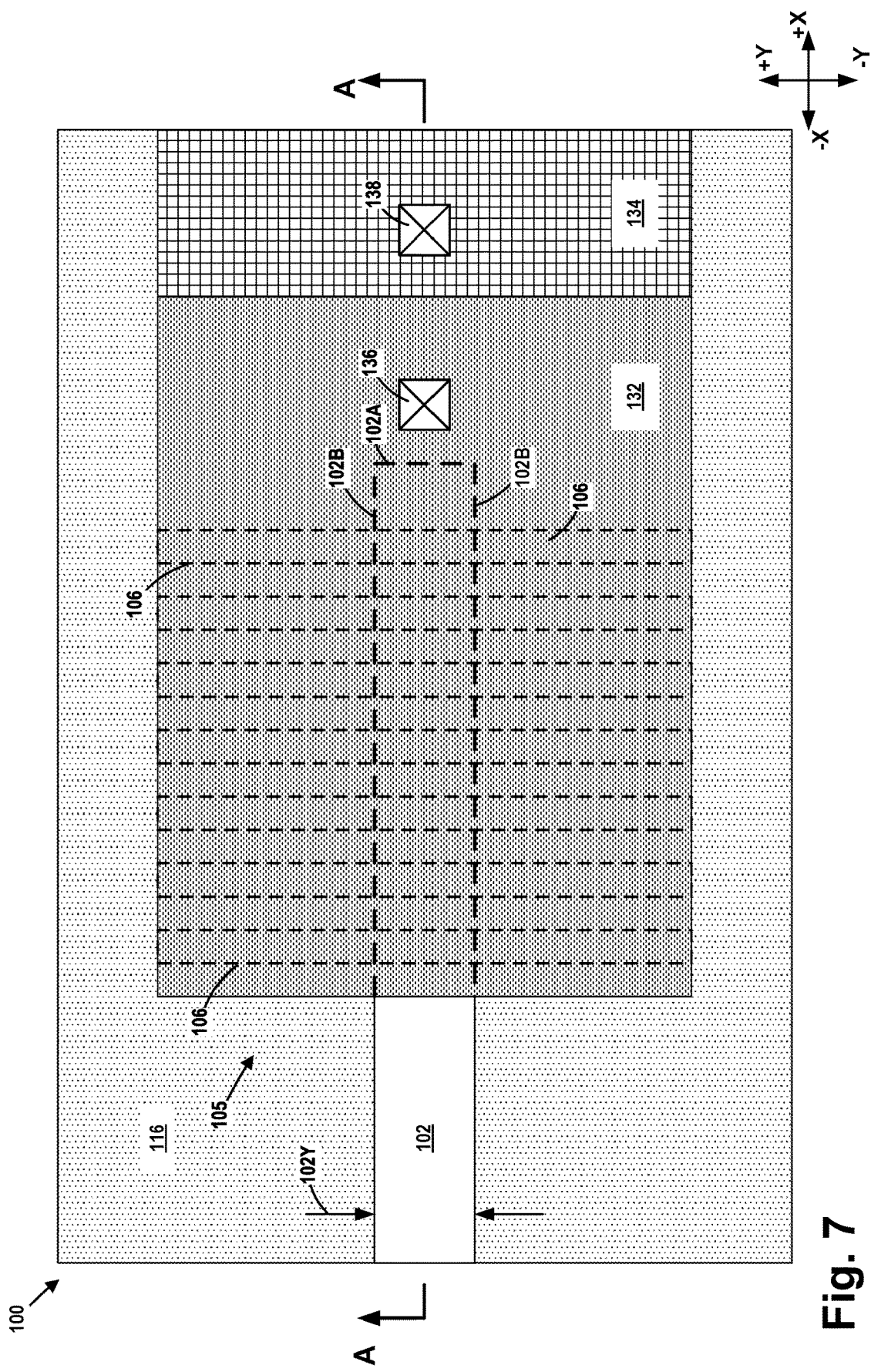
Figure 8:
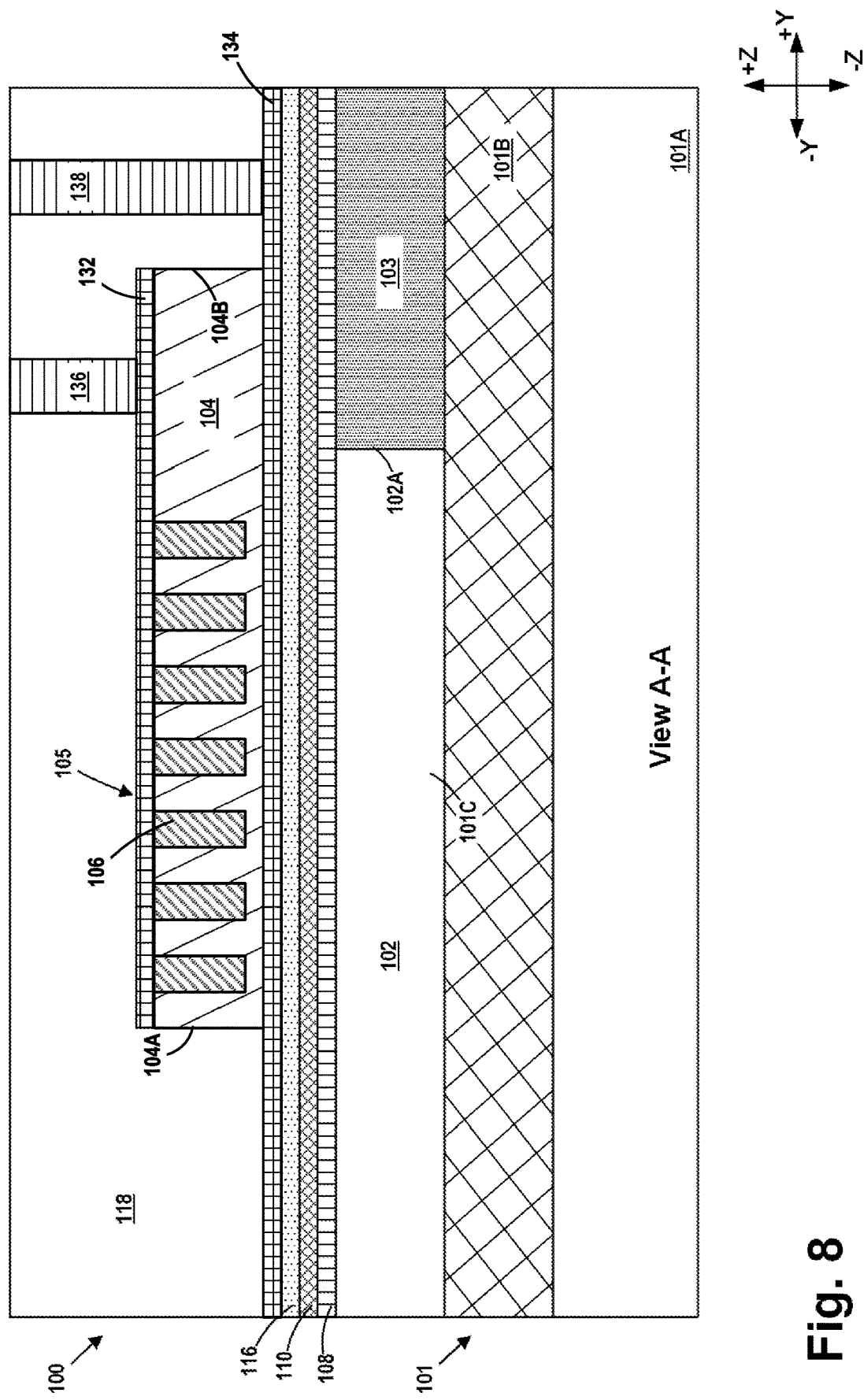

FIG. 7 (plan view) and FIG. 8 (cross-sectional view) depict one illustrative example of the means by which energy—in the form of electrical resistance heating—may be applied to cause a change in the index of refraction of the tunable material of the grating elements 106 to thereby change the functional state of the reconfigurable optical grating/coupler 100. As shown therein, layers of conductive material 132 and 134 have been formed above and below the upper body structure 104. The layers of conductive material 132, 134 may be formed to any desired thickness and they may be comprised of any conductive material. The layers of conductive material 132, 134 may be formed by performing known deposition, masking and etching processing techniques. Illustrative and representative conductive contact structures 136 and 138 are formed so as to conductively contact the layers of conductive material 132, 134, respectively. Any desired number of the conductive contacts 136, 148 may be formed on the product using materials and techniques that are well known to those skilled in the art. Electrical energy is supplied to the layers of conductive material 132, 134 so as to supply heat energy to the tunable material of the grating elements 106.

Figure 9:
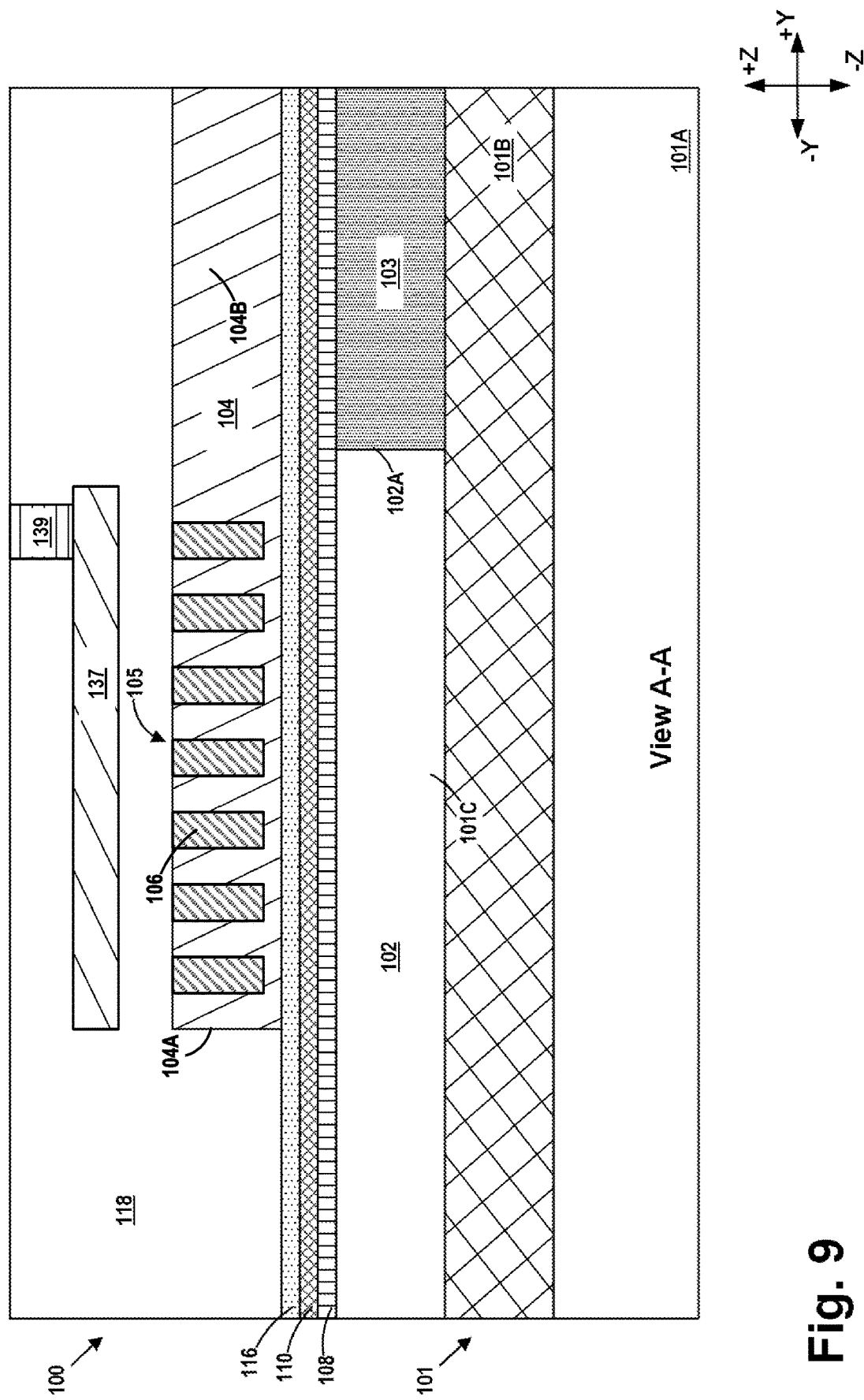

FIG. 9 (cross-sectional view) depicts another illustrative example of the means by which energy—in the form of electrical resistance heating—may be applied to cause the tunable material of the grating elements 106 to change the functional state of the reconfigurable optical grating/coupler 100. In this example, a heater 137 is positioned in the insulating material(s) 118 above the upper surface of the upper body structure 104. Electrical energy is supplied to the heater 137 so as to supply heat energy to the tunable material of the grating elements 106.

Figure 10:
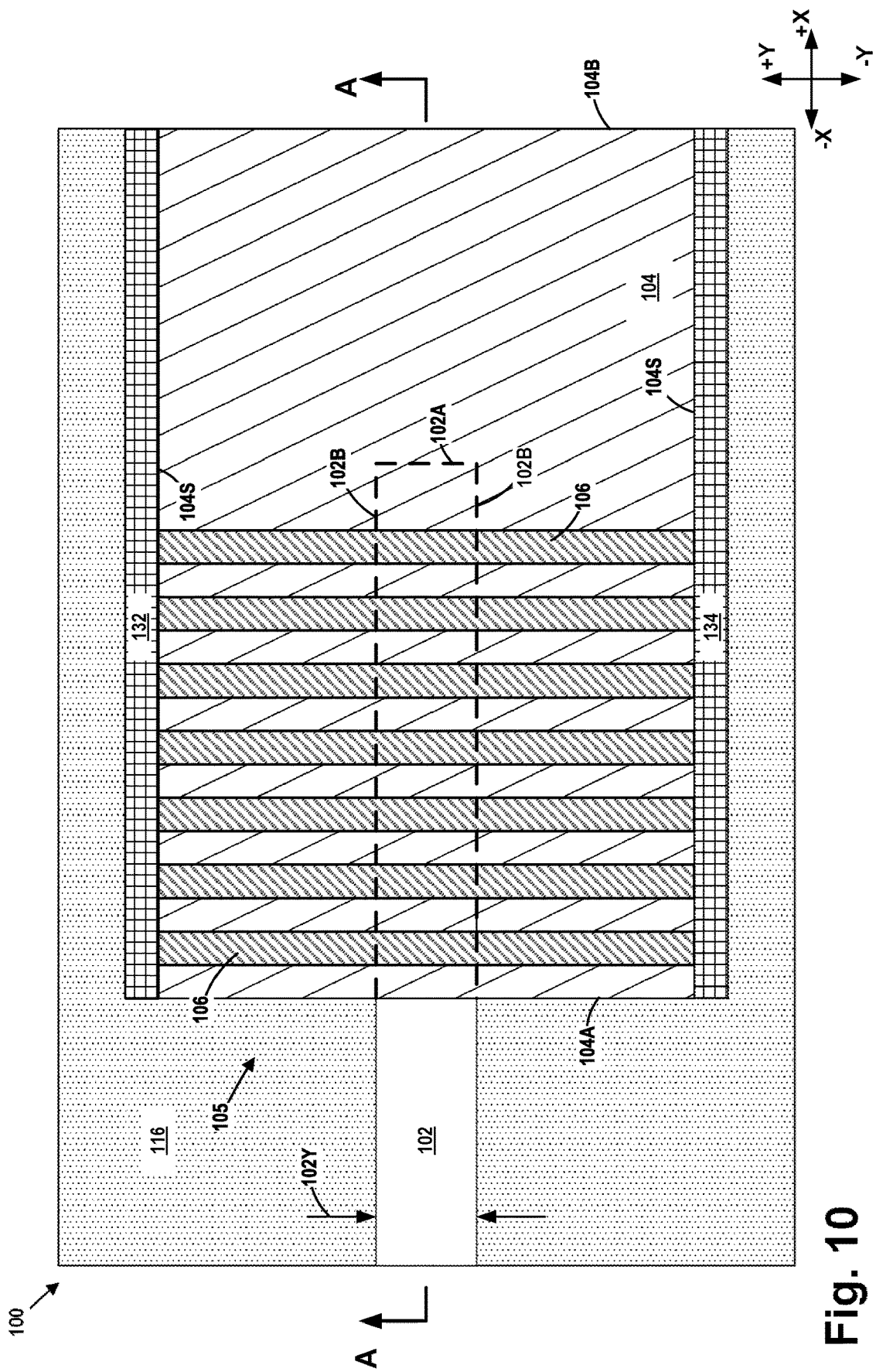

FIG. 10 (plan view) depicts another illustrative example of the means by which energy—in the form of electrical resistance heating—may be applied to cause the tunable material of the grating elements 106 to change the functional state of the reconfigurable optical grating/coupler 100. As shown therein, the above described layers of conductive material 132 and 134 were formed adjacent the side surfaces of the upper body structure 104 and the grating elements 106. The conductive contacts that contact the layers of conductive material 132, 134 are not depicted in FIG. 10. As before, electrical energy is supplied to the layers of conductive material 132, 134 so as to supply heat energy to the tunable material of the grating elements 106.

Figure 11:
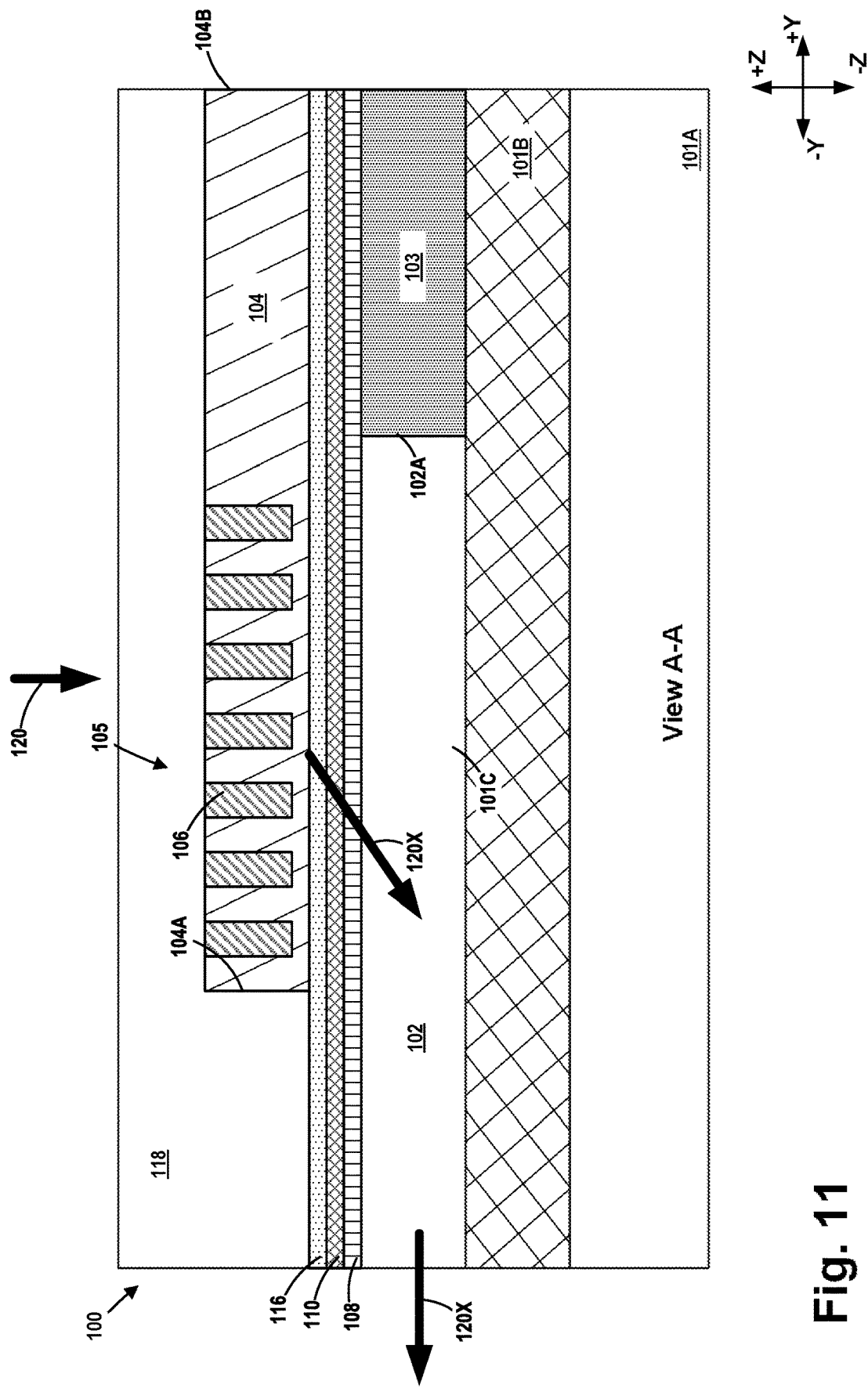
Figure 12:
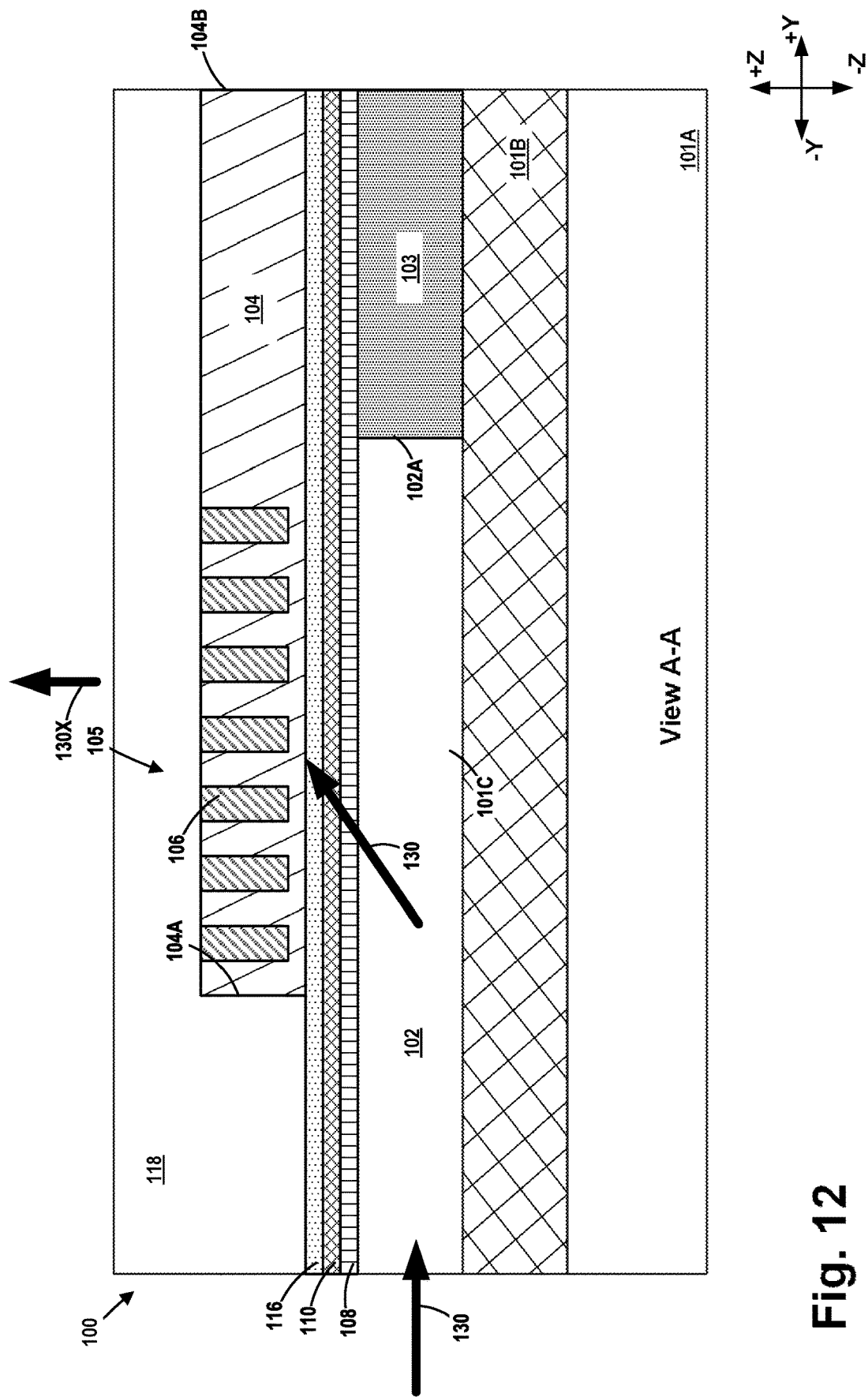

FIGS. 11 and 12 are cross-sectional views that simplistically depict the operation of the reconfigurable optical grating/coupler 100 when it is functioning as an optical grating structure. As shown therein, incident light 120 from a source (not shown), e.g., a laser, an optical fiber, strikes the grating elements 106 of the grating structure 105 where the incident light 120 is split into several beams that travel in different directions. In the depicted example, a portion 120X of the incident light 120 passes through the grating structure 105 to the lower waveguide structure 102 and thereafter to other optical components (not shown) on the chip. Due to the use of the tunable material of the grating elements 106, the amount of the incident light 120 that ultimately is introduced into the lower waveguide structure 102, e.g., the amount of light-splitting, may be controlled or tuned to virtually any desired level. For example, the light-splitting ratio between the incident light 120 that strikes the grating structure 105 and the portion 120X of the light 120 that travels through the lower waveguide structure 102 may be, for example, 90:10, 70:30, 50:50, etc.

FIG. 12 also simplistically depicts the operation of the reconfigurable optical grating/coupler 100 when it is functioning as an optical grating structure. However, in this example, light 130 from a source or component (not shown) on the chip is directed through the lower waveguide structure 102 and strikes the grating structure 105. As shown therein, the grating structure 105 splits the light 130 into several beams that travel in different directions. In the depicted example, a portion 130X of the light 130 passes through the grating structure 105 and exits the chip to some form of optical receiving device, e.g., a fiber optics cable. As before, due to the use of the tunable material of the grating elements 106, the amount of the light 130X that ultimately exits the chip, e.g., the amount of light-splitting, may be controlled or tuned to virtually any desired level. For example, the light-splitting ratio between the light 130 traveling through the lower waveguide 102 that strikes the grating structure 105 and the portion 130X of the light 130 that exits the chip may be, for example, 90:10, 70:30, 50:50, etc.

Figure 13:
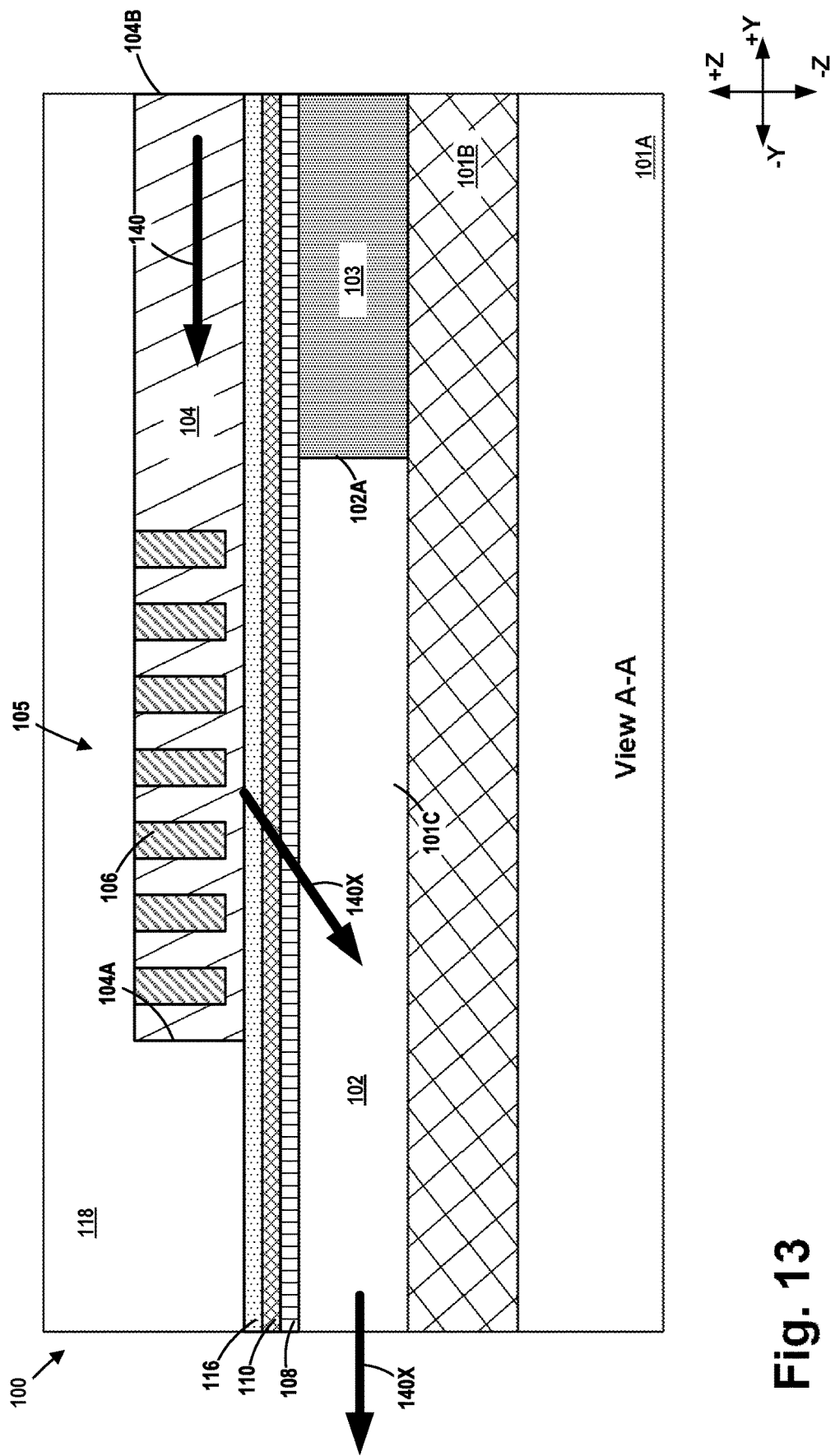
Figure 14:
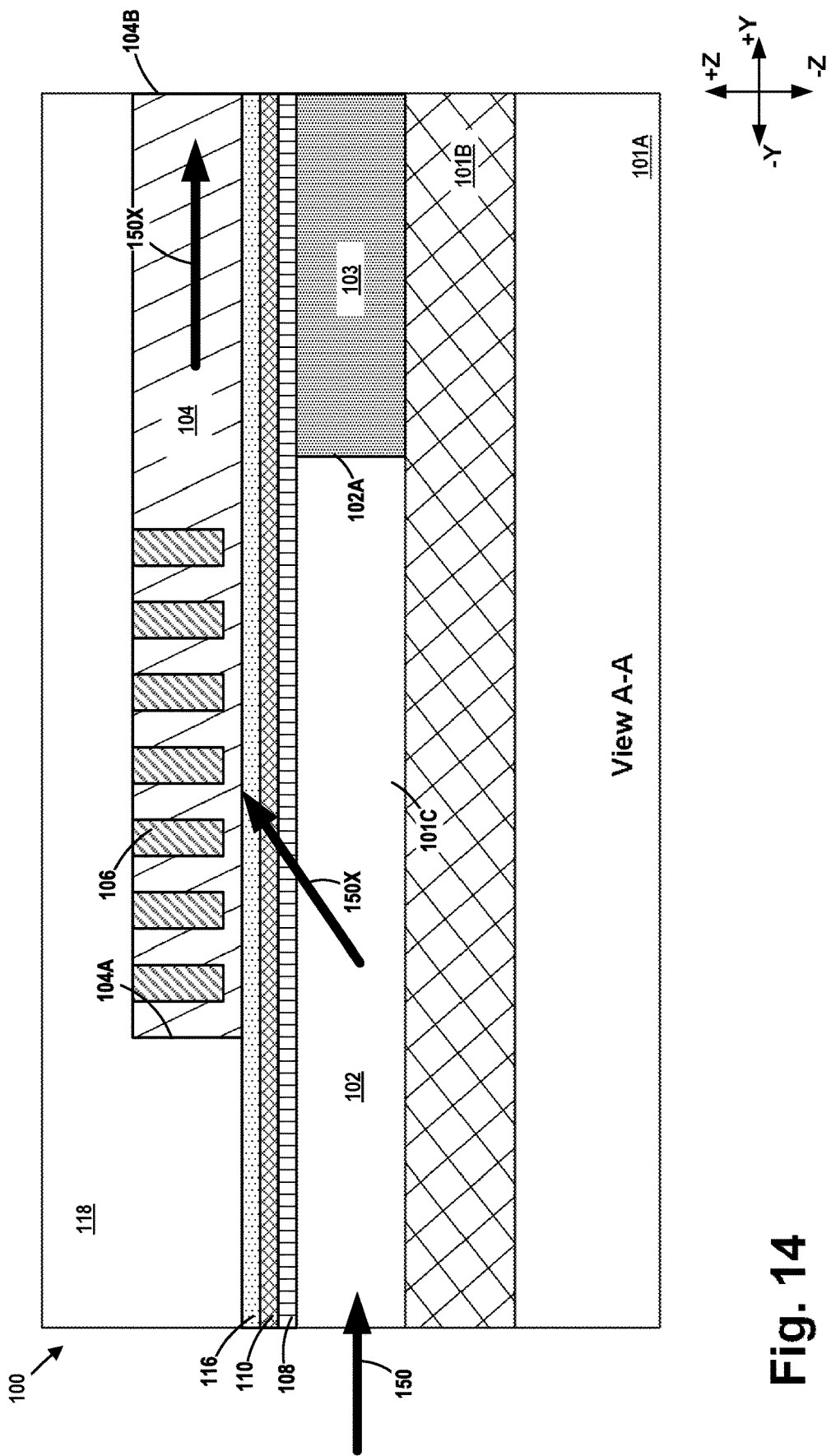

FIGS. 13 and 14 are cross-sectional views that simplistically depict the operation of the reconfigurable optical grating/coupler 100 when it is functioning as a coupler that is adapted to allow transmission of light between two waveguide structures—the upper body structure 104 and the lower waveguide structure 102. More specifically, when the reconfigurable optical grating/coupler 100 is functioning as a coupler, the index of refraction of the tunable material of the grating elements 106 may be approximately the same as that of the index of refraction of the material of the upper body structure 104. As shown in FIG. 13, light 140 from a source or component (not shown) on the chip is directed through the upper body structure 104 and ultimately strikes the grating structure 105. In the depicted example, at least a portion 140X of the light 140 passes through the grating structure 105 to the lower waveguide structure 102 and thereafter to other optical components (not shown) on the chip.

FIG. 14 also simplistically depicts the operation of the reconfigurable optical grating/coupler 100 when it is functioning as a coupler. However, in this example, light 150 from a source or component (not shown) on the chip is directed through the lower waveguide structure 102 and strikes the grating structure 105. In the depicted example, at least a portion 150X of the light 150 passes through the grating structure 105 to the upper body structure 104 and thereafter to other optical components (not shown) on the chip.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is there-fore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A device, comprising:
  a lower waveguide structure, wherein the lower waveguide structure includes SiON;
  an upper body structure positioned above at least a portion of the lower waveguide structure, the upper body structure including a front surface and a back surface opposite to the front surface wherein the upper body structure includes aluminum nitride; and
  a grating structure positioned in the upper body structure, the grating structure comprising a plurality of grating elements, the grating elements comprising a tunable material, wherein by an application of energy thereto, the tunable material changes between a first state having a first index of refraction that is different than of an index of refraction of a material of the upper body structure, and a second state having a second index of refraction that is approximately the same as that of the index of refraction of the material of the upper body structure,
  wherein a portion of the upper body structure includes a tapered configuration that tapers between the front surface and the back surface of the upper body structure along a first axial direction, and
  wherein a portion of the lower waveguide structure includes a tapered configuration that tapers along a second axial direction opposite to the first axial direction.

2. The device of claim 1, wherein the lower waveguide structure includes a front surface and a back surface opposite to the front surface, and wherein the portion of the lower waveguide structure includes the tapered configuration that tapers between the front surface and the back surface of the upper body structure along the second lateral direction.

3. The device of claim 1, wherein, when viewed from above, at least one of the lower waveguide structure and the upper body structure has a substantially trapezoidal configuration.

4. The device of claim 1, wherein the tunable material includes indium tin oxide.

5. The device of claim 1, further comprising a semiconductor-on-insulator (SOI) substrate wherein the lower waveguide structure comprises a portion of an active semiconductor layer of the SOI substrate.

6. The device of claim 1, wherein the upper body structure has a vertical thickness and wherein the plurality of grating elements extend into the upper body structure for a depth that is less than the vertical thickness of the upper body structure.

7. The device of claim 1, wherein the upper body structure has a vertical thickness and wherein the plurality of grating elements extend through the entire vertical thickness of the upper body structure.

8. The device of claim 1, wherein, when viewed in a cross-section taken through an axial length of the upper body structure, each of the plurality of grating elements have a substantially trapezoidal cross-sectional configuration.

9. The device of claim 1, further comprising at least one layer of insulating material positioned between the lower waveguide structure and the upper body structure.

10. The device of claim 9, wherein the at least one layer of insulating material comprises;
  a first layer of silicon dioxide positioned above an upper surface of the lower waveguide structure;
  a layer of silicon nitride positioned above the first layer of silicon dioxide; and
  a second layer of silicon dioxide positioned above the layer of silicon nitride.

11. The device of claim 1, wherein, when viewed from above, at least a portion of the grating structure is positioned vertically above at least a portion of the lower waveguide structure.

12. A device, comprising:
  a lower waveguide structure wherein the lower waveguide structure includes aluminum nitride;
  an upper body structure positioned above at least a portion of the lower waveguide structure wherein the upper body structure includes silicon-germanium, the upper body structure including a front surface and a back surface opposite to the front surface;

at least one layer of insulating material positioned between the lower waveguide structure and the upper body structure; and a grating structure positioned in the upper body structure, the grating structure comprising a plurality of grating elements, the grating elements comprising a tunable material, wherein by an application of energy thereto, the tunable material changes between a first state having a first index of refraction that is different than of an index of refraction of a material of the upper body structure, and a second state having a second index of refraction that is approximately the same as that of the index of refraction of the material of the upper body structure, wherein a portion of the upper body structure includes a tapered configuration that tapers between the front surface and the back surface of the upper body structure along a first axial direction, and wherein a portion of the lower waveguide structure includes a tapered configuration that tapers along a second axial direction opposite to the first axial direction.

13. The device of claim 12, further comprising:

a semiconductor-on-insulator (SOI) substrate wherein the lower waveguide structure includes a portion of an active semiconductor layer of the SOI substrate, and wherein the tunable material includes vanadium dioxide ("$VO_2$"); and a first conductive layer on the upper body structure and a second conductive layer contacting a bottommost surface of the upper body structure.

14. The device of claim 12, wherein the upper body structure has a vertical thickness and wherein the plurality of grating elements extend into the upper body structure for a depth that is less than the vertical thickness of the upper body structure.

15. The device of claim 12, wherein the upper body structure has a vertical thickness and wherein the plurality of grating elements extend through the entire vertical thickness of the upper body structure.

16. The device of claim 12, wherein the lower waveguide structure has a longitudinal centerline and wherein the grating structure has an axial length in a direction that is substantially parallel to the longitudinal centerline and a lateral width in a direction that is substantially transverse to the longitudinal centerline, wherein, when viewed from above, an entirety of the axial length of the grating structure is positioned vertically above the lower waveguide structure.

17. A method for providing a reconfigurable optical grating/coupler device, comprising:

providing a lower waveguide structure including aluminum nitride;

providing an upper body structure including silicon-germanium and positioned above at least a portion of the lower waveguide structure, the upper body structure including a front surface and a back surface opposite to the front surface;

providing a grating structure positioned in the upper body structure, the grating structure comprising a plurality of grating elements, the grating elements including an indium tin oxide-based tunable material, wherein by an application of energy thereto, the indium tin oxide-based tunable material changes between a first state having a first index of refraction that is different than of an index of refraction of a material of the upper body structure, and a second state having a second index of refraction that is approximately the same as that of the index of refraction of the material of the upper body structure, wherein a portion of the upper body structure includes a tapered configuration that tapers between the front surface and the back surface of the upper body structure along a first axial direction, and wherein a portion of the lower waveguide structure includes a tapered configuration that tapers along a second axial direction opposite to the first axial direction.

18. The method of claim 17, further comprising applying energy to the indium tin oxide-based tunable material of the grating elements to change the function of the reconfigurable optical grating/coupler device from an optical grating structure to a coupler or vice-versa.

19. The method of claim 18, wherein applying energy to the indium tin oxide-based tunable material of the grating elements comprises applying energy by heating the indium tin oxide-based tunable material by electrical resistance heating or by irradiating the tunable material with light.

20. The method of claim 18, wherein applying energy to the indium tin oxide-based tunable material of the grating elements to change the function of the reconfigurable optical grating/coupler device from the optical grating structure to the coupler comprises applying energy to the indium tin oxide-based tunable material of the grating elements until such time that the indium tin oxide-based tunable material has the second index of refraction.

* * * * *